June 8, 1943.  F. B. LOMAX  2,321,092
EGG TREATING APPARATUS
Filed Sept. 12, 1940
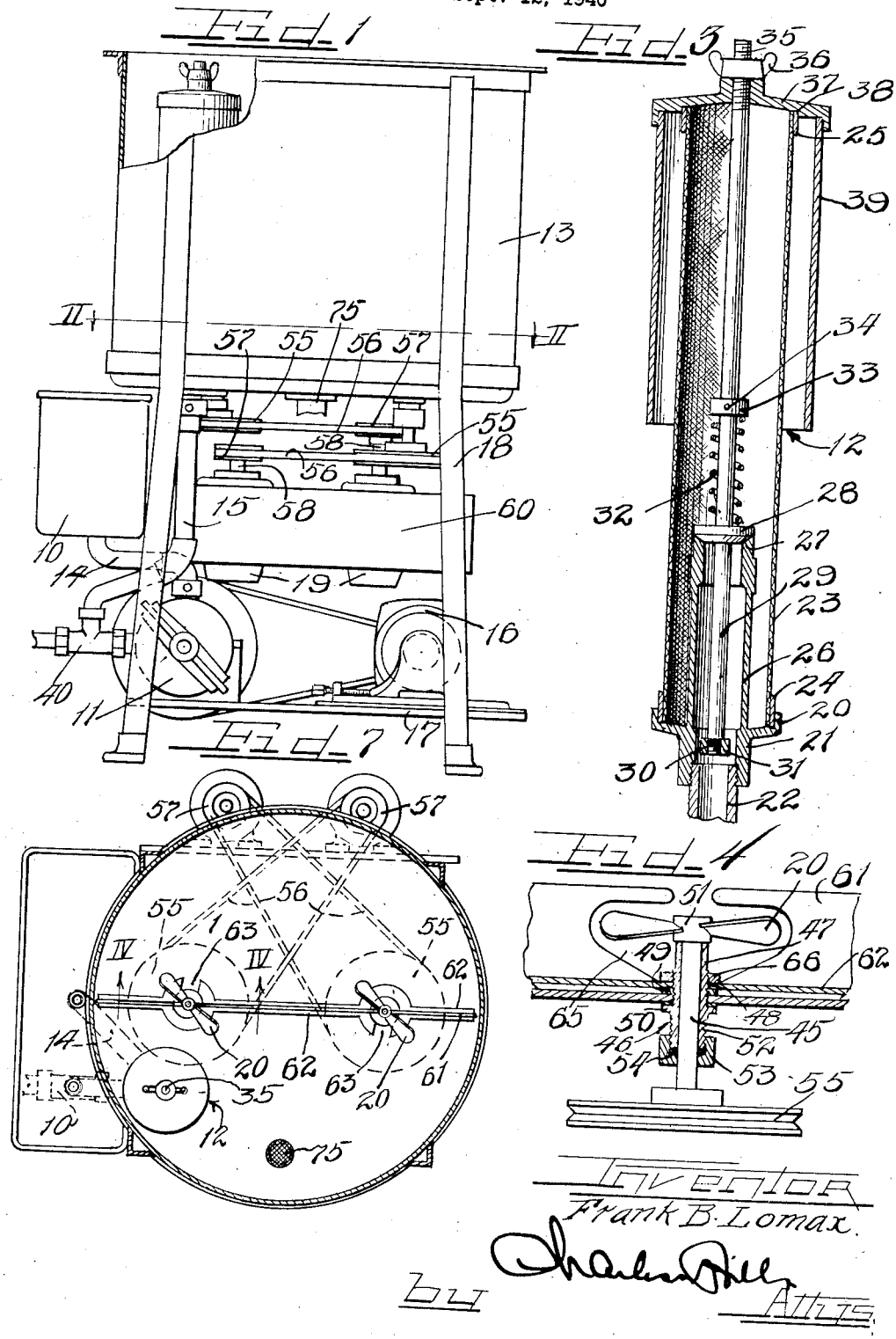
Inventor
Frank B. Lomax
by Charles Hill
Attys Patented June 8, 1943

2,321,092

UNITED STATES PATENT OFFICE 2,321,092

EGG TREATING APPARATUS

Frank B. Lomax, Chicago, Ill.

Application September 12, 1940, Serial No. 356,491

12 Claims. (Cl. 210—154)

This invention relates to an egg treating apparatus, and more particularly to an improved egg filtering apparatus of the same general character and for the same purpose as disclosed in U. S. Letters Patent No. 2,065,384 and No. 2,115,730, granted to W. L. Lomax.

An object of this invention is to provide a more compact and simplified form of egg treating and filtering apparatus of the same general type as that disclosed in said Letters Patent; this subject matter being a continuation of that disclosed in my copending application Serial No. 289,359, filed August 10, 1939.

Another object of this invention is to provide an egg treating and filtering apparatus of such construction and arrangement that the filtering unit for removing chalazae, shell fragments, and foreign matter from the egg meats without causing foaming of the same may be disposed inside the container employed for mixing the ensuing filtering mass into a homogeneous product.

Still another object of this invention is to employ the mixing tank of an egg treating apparatus of the foregoing type as a support and housing for a filtering unit for the egg material, and which unit may be quickly and easily removed for cleaning from the mixing tank or container.

Another object of this invention is to provide an improved agitator structure for use in the aforesaid apparatus and also to provide a novel baffling arrangement for cooperation with the agitating impeller.

In accordance with the general features of this invention, there is provided an apparatus for treating and filtering egg meats to remove foreign matter and chalazae therefrom, including a mixing container for receiving the egg material, a filter disposed in one side of a small portion of the space inside the container, and pump means for forcing the egg material into the filter and laterally therethrough into the mixing container proper.

Another feature of the invention relates to the supporting of the filtering unit on the bottom of the mixing container in such a manner that the filter is removably connected to a support adjacent the bottom of the container whereby the filter may be removed upwardly from the mixing container and any material falling from the interior of the filter will gravitate into the bottom of the filter unit where it is trapped by a novel valve arrangement.

Another feature of the invention relates to the provision of a novel agitating impeller in the bottom of the tank of my novel egg treating apparatus, which impeller is disposed for rotation in a notched-out section of a transverse baffle plate at the bottom of the tank and which plate cooperates with the impeller in effecting a mixing of the egg material being agitated.

Other objects and features of this invention will more fully appear from the following detailed description taken in connection with the accompanying drawing which illustrates a single embodiment thereof, and in which:

Figure 1 is a side view of an egg treating apparatus or machine embodying the features of this invention and partly broken away to show essential parts of the apparatus;

Figure 2 is a plan section taken on the line II—II of Figure 1 looking downwardly;

Figure 3 is an enlarged vertical sectional view taken through the filtering unit of my invention and showing how it is detachably connected to the inlet conduit of the tank; and Figure 4 is an enlarged fragmentary sectional view taken on the line IV—IV of Figure 2 looking in the direction indicated by the arrows and showing the construction of one of the impellers of my apparatus, as well as its relation to the transverse vertical baffle plate at the bottom of the tank.

As shown on the drawing:

The reference characters 10, 11, 12, and 13 designate respectively an egg receiving hopper, a gear pump for impelling under pressure the egg material being treated, a filter unit, and a mixing tank. These elements of my apparatus all broadly function in substantially the same way as the corresponding elements in the aforesaid patents for effecting a filtration and a mixing of egg meats into a homogeneous product. The process involved in the use of the elements is substantially the same as that involved in said Letters Patent, and therefore it will be appreciated that my present invention is not concerned with the changing of the steps involved in the process but rather in the provision of a more compact apparatus for carrying out the steps of the process.

The egg receiver 10, into which egg meats to be treated are dumped, is connected by a conduit 14 to the inlet side of the gear pump 11 which has its discharge side connected by a conduit 15, the upper end of which is in direct communication with the interior of the filtering unit 12.

The gear pump 11, which impels under pressure egg material from the receiver 10 up and into the filter 12, is driven by a motor 16 mounted upon a platform 17 at the bottom of a frame designated generally by the reference character 18. This frame 18, as shown in Figure 1, comprises a plurality of angle irons to which is attached the mixing tank 13. Also, the frame 18 has mounted thereon motors 19 for driving the mixing propellers 20 in the bottom of the tank or container 13, as shown in Figure 2.

My present invention is concerned with the location and arrangement of the filtering unit 12 with respect to the mixing container 13. I have found that by positioning this filtering unit 12 within the confines of the mixing container 13 I am enabled not only to produce a more compact structure but am also enabled to eliminate the necessity of providing a separate housing or closure for the filtering unit. That is to say, the confining wall of the tank 13 can by my present improvement be employed to serve as the enclosing housing for the material pumped through and out of the filtering unit 12.

The filtering unit 12 has its lower end provided with a cup member 21, which is detachably threaded to the upper end of a threaded pipe connection 22 extending into the bottom of the tank and comprising part of the conduit 15, so that egg material can be pumped from the impelling device 11 directly into the bottom of the filtering unit 12.

Supported upon the cup member 21 is a cylindrical screen 23 which is detachably secured to the cup member 21 so as to comprise with the cup member a unitary structure. In order to effect this attachment of the screen 23 to the peripheral flange of the cup member 21, I provide the lower end of the screen with a reinforcing ring 24 of suitable material brazed to the lower end of the screen 23 and telescoping the flange 20 of the cup member 21.

I also provide the upper end of the cylindrical screen 23 with a reinforcing ring 25 which is brazed, soldered, or otherwise suitably secured to the upper end of the cylindrical screen 23.

The cup-shaped member 21 has formed integral with it an upstanding tube 26, the upper end of which is beveled at 27 to form a seat for a valve member 28 slidably mounted upon a rod 29 telescoping the tube 26 and having its lower end anchored at 30 by a screw connection to the transverse element 31 formed in the interior of the cup member 21.

The valve member 28 is normally forced to seated position by means of a compression spring 32 disposed about the rod 29 between the valve member 28 and an adjustable stop or collar 33 anchored to the rod 29 by means of a set screw 34. This arrangement is such that the valve member 28 is always urged under the pressure of the spring 32 toward a seated position, and is also such that fluid pressure entering the tube 26 from the pipe 22 and the conduit 15 will unseat the valve member 28 and allow the fluid to enter in the space defined by the cylindrical screen 23.

The upper end of the rod 29 is threaded at 35, and screwed on this threaded end is a wing nut 36 for holding an upper cap member 37 in engagement with the upper and reenforced end of the cylindrical screen 23. It will be noted that the upper cap 37 is provided with an annular recess 38 in which the reenforcing ring 25 on the upper end of the screen 23 is adapted to be seated when the cap 37 is tightly clamped against the upper end of the screen.

Also secured to the cap 37 is a downwardly extending cylindrical skirt 39 which comprises an integral part of the cap member 37 and serves as a hood for the upper half of the cylindrical screen 23. It will be noted that this hood 39 is slightly spaced from the exterior surface of the screen so that egg material passing through the screen can enter this space and then gravitate downwardly into the tank proper.

From the above detail description of the filter unit 12, it is apparent that this filter may be removed as a single unit by merely unscrewing it at its lower cup end 21 from the pipe connection 22. Prior to the removal of the unit for the purpose of cleaning or otherwise, the connection 22, as well as the conduit 15 can be drained and relieved of egg material by opening up a suitable valve connection (not shown) connected to the T 40 which connects the lower end of the conduit 15 to the discharge side of the pump 11. Once the valve member 28 has been relieved of fluid pressure, it will be forced to a closed position by the spring 32, so that when the filter is removed as a unit any fluid inside of the cylindrical screen is trapped therein and prevented from gravitating downwardly into the bottom of the tank as the unit is being raised out of the tank.

Thereafter the parts of the filtering unit may be disassembled by removing the wing nut 36 and cap 37, and removing the cylindrical screen endwise out of the cup member 21.

In the normal use of the filter unit, as shall become more apparent hereinafter, the filter unit being disposed to one side of the center of the tank serves to aid in the mixing of the egg material in the tank as the material is whirled by agitating means. Also, the hood 39 tends to direct the egg material entering the tank toward the lower part of the tank. That is to say, this hood 39 directs the material discharged from the upper end of the filtering unit downwardly toward the lower part of the tank and into the area of greatest agitation in the tank. The reason that the area of greatest agitation is in the lower part of the tank is because the agitating devices, as I shall describe hereinafter, are located at the bottom of the tank.

From the foregoing detailed description, it is apparent that this filtering unit may be employed to practice the process of the previously noted Lomax patents. During this process, a filter bed of egg material including chalazae, fragments of shell, and other forms of matter, is built up on the inside surface of the screen 23, and it is through this filter bed that the egg meats are forced by the pump 11 into the mixing container 13 where such filter material is mixed into a homogeneous product. The pump 11, of course, impels the liquid material with a pressure in excess of atmospheric pressure so that the resistance of the barrier on the screen 23 will be overcome to the extent of allowing predetermined quantities of egg material to be passed therethrough. Then, too, after the apparatus has been in use for the treatment of a given amount of material, it is necessary to remove the screen 23 from the support and to clean the same. My invention, as noted hereinbefore, facilitates this cleaning operation which may take place once or twice during a given day's use of the apparatus and furthermore eliminates the need of a separate housing for the screen 23.

It should also be noted that the filtering unit 12 is disposed alongside of a vertical wall of the tank 13 and occupies only a relatively small amount of the space inside of the tank 13.

I shall now proceed to describe the novel features of my agitating or mixing mechanism associated with the bottom of the tank and interrelated with the filtering unit disposed to one side of the tank. This mixing or agitating mechanism comprises a pair of spaced impellers 20—20, which are identical in construction and are mounted identically, so that a description of one will suffice for both.

Each of these impellers comprises a two-bladed element rotatably splined to the upper end of a small vertical stub shaft 45 extending through the bottom of the tank and provided with a suitable packing gland assembly 46. As shown, this packing gland assembly 46 comprises an externally threaded sleeve 47 disposed about the shaft and extending through a suitable aperture in the bottom of the tank. An intermediate portion of this sleeve is threaded at 48, and this threaded portion extends through the opening in the bottom of the tank. Screwed onto this threaded portion 48 is a collar or washer 49 which is adapted to be screwed downwardly into clamped engagement with the upper surface of the bottom of the tank, so that the bottom of the tank is clamped between this collar 49 and a packed off shoulder 50 formed on the sleeve 47. The upper end of the sleeve 47 serves as a shoulder or an abutment against which the hub 51 of the impeller 20 is adapted to rest.

The lower end of the sleeve 47 is also threaded at 52 and has mounted on it a gland element 53, in which is disposed a packing 54 for packing off the stub shaft 45. The lower end of the stub shaft is secured to a pulley 55 by means of which the shaft is driven.

Each of the pulleys 55 for the propellers is driven by a belt 56 (Figure 1) trained about the pulley and about a motor driven pulley 57 mounted on the motor shaft 58 of the motor 19. The two motors for driving the two impellers 20 are disposed side by side and mounted in a common frame assembly 60 suitably carried by the frame 18 of the tank.

It will be noted that the pulleys 55 are staggered (Figure 1), so that one is disposed above the other. This is enabled by reason of the fact that one of the shafts 45 is made slightly longer than the other. However, the construction and operation of the two driving systems for the agitators 20 are the same.

Each of the propellers 20, as shown in Figures 2 and 3, is mounted to revolve transversely through a vertical baffle plate 61 disposed in the bottom of the tank. This baffle plate 61 is provided at its bottom with a horizontal flange 62 having oppositely facing notches 63—63 (Figure 2) for receiving the two spaced sleeves 47—47. These notches 63—63 are brought into register and engagement with the sleeves 47—47 by turning or rotating the baffle plate 61 in a horizontal plane at the bottom of the container. Also, the baffle plate 61 is provided with a pair of spaced openings (Figure 4) 65—65, each of which is of a size to permit the propeller 20 to rotate therein. The flange 62 of the baffle plate 61 is secured or clamped in place by nuts 66—66 threaded on the sleeves 47—47.

This baffle 61 serves to aid in the mixing or agitation of the fluid being whirled by the propellers or impellers 20, so that a zone of greater agitation is provided in the lower part of the tank. In addition thereto, as the fluid is whirled in the tank through the instrumentality of the two impellers 29, the whirling fluid strikes the filtering unit 12 and is in that way interrupted, thereby enabling a still more thorough mixing of the product.

Thus, there is provided an arrangement which enables a complete mixing of the mass of material discharged in the tank from the filtering unit without resulting in any foaming of the same.

The tank 13 may be provided with any suitable outlet such, for example, as the outlet 75, which may be controlled by a valve (not shown), so that after the egg material has been mixed in the tank, the same may be withdrawn from the tank through the valve controlled outlet 75.

I claim as my invention:

1. In an apparatus for treating and filtering egg meats to remove foreign matter and chalazae therefrom, a mixing container for receiving the egg material and having an outlet, means for whirling, agitating and mixing said material in said container, a filter disposed in one side of a portion of the space inside said container, and means for forcing egg material into said filter and laterally therethrough into the mixing container proper, said container having an inlet conduit connection through which egg material is forced and said filter being detachably connected to said connection and extending vertically along a side wall of the container, said filter comprising a screen clamped between cap members the lowermost of which is detachably secured to said conduit connection. the uppermost cap member also being provided with a hood surrounding and spaced from the screen arranged to cover a major portion of the screen and to direct egg material filtered by the upper portion of the screen downwardly toward the bottom of the container.

2. In an apparatus for treating and filtering egg meats to remove foreign matter and chalazae therefrom, a mixing container for receiving the egg material and having an outlet, means for whirling, agitating and mixing said material in said container, a filter disposed in one side of a portion of the space inside said container, and means for forcing egg material into said filter and laterally therethrough into the mixing container proper, said container having an inlet conduit connection through which egg material is forced and said filter being detachably connected to said connection and extending vertically along a side wall of the container, said filter having disposed internally thereof valve means urged toward a closed position and being adapted to be opened by the pressure of fluid entering said filter from said connection.

3. In an apparatus for treating and filtering egg meats to remove foreign matter and chalazae therefrom, a mixing container for receiving the egg material and having an outlet, means for whirling, agitating and mixing said material in said container, a filter disposed in one side of a portion of the space inside said container, and means for forcing egg material into said filter and laterally therethrough into the mixing container proper, said container having an inlet conduit connection through which egg material is forced and said filter being detachably connected to said connection and extending vertically along a side wall of the container, said filter being provided wtih means for preventing egg material from gravitating from the lower end of the filter when the filter is being detached from said inlet connection.

4. A filter unit comprising an elongated tubular screen, closure members at the opposite ends thereof, a tubular member connected to one of said closure members disposed inside of said screen and defining a valve seat, a spring urged valve inside of said screen cooperable with said seat, and fluid conduit means connected to one of said closure members and in communication with the interior of said tubular member.

5. A filter unit comprising an elongated tubular screen, closure members at the opposite ends thereof, a tubular member connected to one of said closure members disposed inside of said screen and defining a valve seat, a spring urged valve inside of said screen cooperable with said seat, and fluid conduit means connected to one of said closure members and in communication with the interior of said tubular member, said valve being mounted on an elongated member inside of said screen connected at one end to one of said closure members and detachably connected at its other end to the other of said closure members.

6. A filter unit comprising an elongated tubular screen, closure members at the opposite ends thereof, a tubular member connected to one of said closure members disposed inside of said screen and defining a valve seat, a spring urged valve inside of said screen cooperable with said seat, and fluid conduit means connected to one of said closure members and in communication with the interior of said tubular member, said valve being mounted on an elongated member inside of said screen connected at one end to one of said closure members and detachably connected at its other end to the other of said closure members, said elongated member having disposed thereon a spring for forcing said valve along the elongated member into seated position and in a direction opposite to the flow of fluid through said fluid conduit means.

7. In an apparatus for treating and filtering egg material to remove foreign matter and chalazae therefrom, a mixing container for receiving the egg material, means for filtering the egg material supplied thereto, means for whirling, agitating and mixing said material in said container including impellers having drive shafts extending through the bottom of the container, baffle means at the lower part of the container having cutaway portions for receiving said impellers, said baffle means having portions in the vicinity of said cutaway portions constructed and arranged to embrace said shafts, said embracing portions being provided with slots adapted to receive said shafts for alignment of the baffle means.

8. In an apparatus for treating and filtering egg material to remove foreign matter and chalazae therefrom, a mixing container for receiving egg material, means for filtering egg material supplied thereto, means for whirling, mixing and agitating said material in said container including impeller means having drive shafts extending through the bottom of the container and a baffle disposed transversely of the container in the vicinity of the bottom thereof, said baffle having cutaway portions for receiving the impeller and having portions arranged and constructed to embrace the drive shafts of the impellers, said last named portions each having a slot therein disposed to admit the respective drive shaft when the baffle is inserted and rotated within the container adjacent the bottom thereof.

9. In an apparatus for treating and filtering egg meats to remove foreign matter and chalazae therefrom, a mixing container for receiving the egg material and in which said material is mixed, a filter disposed in one side of small portion of the space inside said container and adjacent a vertical wall of the container, said filter extending vertically alongside said wall, means for forcing egg material into said filter and laterally therethrough into the mixing container proper, and means in said container for whirling the egg material therein, said filter being in the path of the whirled fluid and thus interrupting the whirling fluid, said filter including a valve controlled trap therein operable to prevent residue and foreign matter accumulated in the filter from falling therefrom into the filtered contents of the container when the filter is being removed from the container for cleaning purposes.

10. In an apparatus for treating egg material to remove foreign material therefrom, comprising a container, a tubular filter extending vertically and being disposed alongside and adjacent an inner surface of a vertical wall of said container, an inlet egg material carrying conduit in direct communication with the interior of said filter, and an egg material carrying conduit in communication with said container independent of said conduit connected to said filter, said filter being removable vertically from said container without disconnecting said conduits from said container, said tubular filter comprising a cylindrical screen capped at both ends with a connecting rod extending vertically between the capped ends, the lower of said capped ends having formed thereon a tubular valve seat and said rod having slidable thereon a valve for engaging said seat to prevent downward discharge of material accumulating in said filter into the container when the filter is being removed from the container for cleaning purposes.

11. In an apparatus for treating and filtering egg meats to remove foreign matter and chalazae therefrom, a mixing container for receiving the egg material and in which said material is mixed, a filter disposed in one side of small portion of the space inside said container and adjacent a vertical wall of the container, said filter extending vertically alongside said wall, and means for forcing egg material into said filter and laterally therethrough into the mixing container proper, said means comprising an impeller device for forcing said egg material by a pressure in excess of atmospheric pressure through said filter directly against egg material already in the container and for thus causing a filter bed of egg material to be built up on the filter and through which subsequent material impelled by said means is forced, said filter including a downwardly extending tubular hood over a major portion of the upper part of the filter for directing the filtered material discharged therefrom downwardly toward the bottom of the container and including a valve controlled trap at the lower portion of the filter for preventing the discharge of the trapped material into the container when the filter is being removed therefrom for cleaning purposes.

12. In a filter construction, an elongated cylindrical screen capped at both ends and having its lower end provided with an inlet for permitting liquid to be forced upwardly into the interior of the screen and outwardly through the foraminae of the screen, the lower cap of said screen having disposed thereabove a valve seat and a valve cooperable with said seat provided with seating means adapted to be overcome by the pressure of the incoming liquid and arranged to force said valve against said seat into closed position when no liquid is flowing into the filter so as to trap in the filter any material filtered out of the liquid whereby such trapped material cannot gravitate endwise from the filter when the filter is being removed for cleaning purposes.

FRANK B. LOMAX.